United States Patent
Terada

(10) Patent No.: US 9,879,107 B2
(45) Date of Patent: Jan. 30, 2018

(54) FLUORINATED COPOLYMER

(71) Applicant: ASAHI GLASS COMPANY, LIMITED, Chiyoda-ku (JP)

(72) Inventor: Tatsuya Terada, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/354,390

(22) Filed: Nov. 17, 2016

(65) Prior Publication Data
US 2017/0066861 A1    Mar. 9, 2017

Related U.S. Application Data

(63) Continuation of application No. PCT/JP2015/068400, filed on Jun. 25, 2015.

(30) Foreign Application Priority Data

Jun. 27, 2014  (JP) ................. 2014-132109

(51) Int. Cl.
| | | |
|---|---|---|
| C08L 27/12 | (2006.01) | |
| C08F 214/26 | (2006.01) | |
| C08F 210/02 | (2006.01) | |

(52) U.S. Cl.
CPC ........ C08F 214/265 (2013.01); C08F 210/02 (2013.01)

(58) Field of Classification Search
USPC .......................................... 526/252; 525/199
See application file for complete search history.

(56) References Cited

U.S. PATENT DOCUMENTS

| | | | | |
|---|---|---|---|---|
| 2003/0162923 A1* | 8/2003 | Funaki | .................. | B32B 1/08 526/250 |
| 2004/0142134 A1 | 7/2004 | Funaki et al. | | |
| 2007/0232754 A1* | 10/2007 | Aida | .................. | C08F 214/265 525/199 |
| 2010/0204423 A1* | 8/2010 | Fukunaga | ............. | C08F 214/18 526/252 |
| 2010/0286352 A1 | 11/2010 | Fukunaga et al. | | |

FOREIGN PATENT DOCUMENTS

| | | |
|---|---|---|
| EP | 2 559 730 A1 | 2/2013 |
| JP | 2004-238405 | 8/2004 |
| JP | 2007-297594 | 11/2007 |
| JP | 2012-21054 | 2/2012 |
| JP | 2015-4057 | 1/2015 |
| WO | WO 2006/134764 A1 | 12/2006 |
| WO | WO-2009/096547 A1 * | 8/2009 |
| WO | WO 2009/096547 A1 | 8/2009 |
| WO | WO 2014/189016 A1 | 11/2014 |

OTHER PUBLICATIONS

International Search Report dated Sep. 15, 2015 in PCT/JP2015/068400, filed on Jun. 25, 2015.
Satoru Imai et al., "Chosa Bunki o Donyu shita ETFE no Ichijiku Shincho Nendo Tokusei(Properties of uniaxial elongational viscosity of ETFE with long-chain branches)", Journal of the Japan Society of Polymer Processing, 2010, 21, pp. 2.
Satoru Imai et al., "ETFE no Chosa Bunki ga Yoyu Nendo Tokusei ni Oyobosu Eikyo ni Kanshite(Effect of long-chain branch introduced ETFE on Melt Viscosity Properties)", Polymer Processing Symposia, 2011, pp. 4 ( with English Abstract).
Takashi Kato et al., "Rheological measurements of LCB-ETFE and application to foaming", Polymer Processing Symposia, 2012, pp. 4.
Takashi Kato et al., "Rheological behavior and foamed cell size of ETFE with copolymerized divinyl monomer", Rheology Toronkai Koen Yoshishu, 61, 2013, pp. 2.
Takashi Kato et al., "Melt rheological behavior and batch foaming of modified ETFE", Polymer Processing Symposia, 2014, pp. 4 ( with English Abstract).

* cited by examiner

*Primary Examiner* — Mark Kaucher
*Assistant Examiner* — Henry Hu
(74) *Attorney, Agent, or Firm* — Oblon, McClelland, Maier & Neustadt, L.L.P.

(57) ABSTRACT

A fluorinated copolymer excellent in adhesion and elongation deformation processability. This fluorinated copolymer has carbonyl groups, its melting point is from 120 to 230° C., the ratio (X/W) of the melt tension X (N) to the load W (N) at the time of measuring the melt tension X, is from $0.5 \times 10^{-4}$ to $2.0 \times 10^{-4}$, it contains units derived from the following monomers (a), (b), and (c), the molar ratio of the units derived from the monomer (a) to the units derived from the monomer (b) is from 30/70 to 70/30, and the total content of the units derived from the monomer (a) and the units derived from the monomer (b) is from 80 to 99.995 mol % based on the total of all units (a), (b) and (c): Monomer (a): tetrafluoroethylene; Monomer (b): ethylene; Monomer (c): a monomer having two or more polymerizable carbon-carbon double bonds.

15 Claims, No Drawings

FLUORINATED COPOLYMER

TECHNICAL FIELD

The present invention relates to a fluorinated copolymer.

BACKGROUND ART

A fluororesin such as polytetrafluoroethylene, a tetrafluoroethylene/perfluoro(alkyl vinyl ether) copolymer or an ethylene/tetrafluroethylene copolymer, has excellent characteristics in heat resistance, chemical resistance, water resistance, oil resistance, weather resistance, aging resistance, gas barrier properties, fuel barrier properties, releasing properties, non-stickiness, stain resistance, colorant adhesion resistance, non-elution properties, etc. and thus is used in various fields such as the semiconductor industry, aircraft and automotive industry, food manufacturing industry, medical industry, etc.

In the above applications, in order to make up for deficiency in mechanical properties such as wear resistance, toughness, flexibility, etc. or high costs, such an attempt has been made that a fluororesin is made to be a laminate with another general-purpose resin material, etc.

However, a fluororesin is generally poor in adhesion to another material, and if it is laminated with another resin material as it is, it is difficult to obtain a strong interlayer adhesion. Further, a fluororesin generally has a high molding temperature as compared with other resin materials, whereby there is a problem such that many other resin materials cannot withstand the molding condition of the fluororesin.

In order to solve such problems, Patent Document 1 proposes a multilayer laminate containing a laminate wherein a layer made of a fluororesin having functional groups such as acid anhydride groups (—CO—O—CO—) and having a melting point of from 120 to 230° C., and a layer made of a thermoplastic resin having functional groups capable of reacting with the functional groups of the fluororesin to form chemical bonds, are directly bonded.

The fluororesin disclosed in Patent Document 1 has functional groups such as acid anhydride groups, whereby its adhesion to another material is improved. In addition to this, the thermoplastic resin has specific functional groups, so that the adhesive functional groups and the functional groups of the thermoplastic resin will be reacted to form chemical bonds at the time of lamination, whereby the interlayer adhesion is said to be further enhanced. Further, this fluororesin has a low melting point and therefore can be molded at a molding temperature at which the thermoplastic resin can withstand.

However, this fluororesin is insufficient in elongation deformation processability and thus has a problem such as unevenness in thickness or wrinkles due to thinning, or non-uniformity of bubble diameters, when subjected to mold processing accompanying elongation deformation (such as blow molding, inflation molding, foam molding or film forming).

PRIOR ART DOCUMENT

Patent Document

Patent Document 1: WO2006/134764

DISCLOSURE OF INVENTION

Technical Problem

It is an object of the present invention to provide a fluorinated copolymer excellent in adhesion and elongation deformation processability.

Solution to Problem

The present invention has the following aspects.
[1] A fluorinated copolymer characterized in that
it has carbonyl groups,
its melting point is from 120 to 230° C.,
the ratio (X/W) of the melt tension X (N) to the load W (N) at the time of measuring the melt tension X, is from $0.5 \times 10^{-4}$ to $2.0 \times 10^{-4}$ [N/N],
it comprises units derived from the following monomer (a), units derived from the following monomer (b), and units derived from the following monomer (c),
the molar ratio ([units derived from monomer (a)]/[units derived from monomer (b)]) of the units derived from the monomer (a) to the units derived from the monomer (b) is from 30/70 to 70/30, and
the total content of the units derived from the monomer (a) and the units derived from the monomer (b) is from 80 to 99.995 mol % based on the total of all units:
Monomer (a): tetrafluoroethylene.
Monomer (b): ethylene.
Monomer (c): a monomer having two or more polymerizable carbon-carbon double bonds.
[2] The fluorinated copolymer according to [1], wherein the following volume flow rate is from 0.5 to 100 mm³/sec:
Volume flow rate: extrusion rate (mm³/sec) at the time of extruding the fluorinated copolymer from an orifice having a diameter of 2.1 mm and a length of 8 mm under a pressure of 68.7N/cm² at a temperature of the melting point+50° C.
[3] The fluorinated copolymer according to [1] or [2], wherein the carbonyl groups are derived from the following monomer (d):
Monomer (d): a monomer having a carbonyl group and one polymerizable carbon-carbon double bond.
[4] The fluorinated copolymer according to [3], wherein the monomer (d) is an acid anhydride of an unsaturated dicarboxylic acid.
[5] The fluorinated copolymer according to [1] or [2], wherein the carbonyl groups are derived from a radical polymerization initiator having a carbonyl group or a chain transfer agent having a carbonyl group.
[6] The fluorinated copolymer according to any one of [1] to [5], wherein the following content of carbonyl groups is from $1.5 \times 10^2$ to $1 \times 10^5$:
Content of carbonyl groups: the number of carbonyl groups to $1 \times 10^6$ carbon atoms as the number of carbon atoms in the molecular chain composed of repeating units in the fluorinated copolymer, as determined by an IR absorption spectrum analysis using a Fourier transform infrared spectrometer.
[7] The fluorinated copolymer according to any one of [1] to [6], wherein the content of the units derived from the monomer (c) is from 0.02 to 0.15 mol % based on the total of all units.
[8] The fluorinated copolymer according to any one of [1] to [7], wherein the monomer (c) is represented by the following formula (c1):

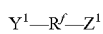
(c1)

wherein $R^f$ is a fluoroalkylene group, and $Y^1$ and $Z^1$ are each independently a vinyl group, a trifluorovinyl group or a trifluorovinyloxy group.

[9] The fluorinated copolymer according to [8], wherein $R^f$ is a perfluoroalkylene group having 2 to 8 carbon atoms.

[10] The fluorinated copolymer according to [8], wherein the monomer (c) is a compound represented by $CH_2=CH-(CF_2)_{n2}-CH=CH_2$ (wherein n2 is 4 or 6).

[11] The fluorinated copolymer according to any one of [1] to [10], which further has units derived from the following monomer (e):

Monomer (e): hexafluoropropylene.

[12] The fluorinated copolymer according to [11], wherein the content of the units derived from the monomer (e) is from 4 to 19 mol % based on the total of all units.

[13] The fluorinated copolymer according to any one of [1] to [12], which further has units derived from a monomer (f1) represented by the following formula (f1):

$$\text{Monomer }(f1):\ CH_2=CX^2(CF_2)_{n3}Y^2 \qquad (f1)$$

wherein $X^2$ and $Y^2$ are each a hydrogen atom or a fluorine atom, and n3 is an integer of from 2 to 10.

[14] The fluorinated copolymer according to [13], wherein the monomer (f1) is a compound represented by $CH_2=CH(CF_2)_{n4}F$ or $CH_2=CF(CF_2)_{n4}H$ (wherein n4 is an integer of from 2 to 6).

[15] The fluorinated copolymer according to [13] or [14], wherein the content of the units derived from the monomer (f1) is from 0.1 to 15 mol % based on the total of all units.

Advantageous Effects of Invention

According to the present invention, it is possible to provide a fluorinated copolymer excellent in adhesion and elongation deformation processability.

DESCRIPTION OF EMBODIMENTS

The following definitions of terms apply throughout this specification including claims.

A "monomer" is a compound having a polymerizable carbon-carbon double bond.

The term "units derived from a monomer" is meant for structural units composed of monomer molecules, formed by polymerization of a monomer, and a part of monomer molecules may be lost due to decomposition.

A "branched structure" means a structure wherein a molecular chain consisting of repeating units is branched on the way, and a pendant group which is a part of a monomer constituting units is not included in the branch structure.

A "non-fluorinated thermoplastic resin" means a thermoplastic resin containing no fluorine atom.

<Fluorinated Copolymer>

The fluorinated copolymer of the present invention (hereinafter referred to also as "copolymer (A)") has carbonyl groups. By having carbonyl groups, the copolymer (A) is capable of exhibiting excellent adhesion to a material other than a fluororesin, for example, to a non-fluorinated thermoplastic resin, etc.

Carbonyl groups may be contained in the main chain terminal groups of the copolymer (A) or may be contained in pendant groups, or may be contained in both of them.

In the copolymer (A), a carbonyl group may be present as it is in the carbon chain, or may be present as a group in combination of a carbonyl group and another group or atom (hereinafter referred to also as a "carbonyl group-containing group") in the carbon chain or in the carbon chain terminals.

Another group means a group other than a carbonyl group and a hydrocarbon group.

The carbonyl group-containing group may, for example, be an acid anhydride group, a carbonate group, a carboxy group, a haloformyl group, an alkoxycarbonyl group, etc.

The haloformyl group may be represented by $-C(=O)-X$ (wherein X is a halogen atom). As the halogen atom in the haloformyl group, a fluorine atom, a chlorine atom, a bromine atom, etc. may be mentioned, and a fluorine atom is preferred. That is, as the haloformyl group, a fluoroformyl group (hereinafter referred to also as a "carbonyl fluoride group") is preferred.

An alkoxy group in the alkoxycarbonyl group may be linear or branched, and is preferably an alkoxy group having from 1 to 8 carbon atoms, particularly preferably a methoxy group or an ethoxy group.

The carbonyl group-containing group to be contained in the copolymer (A) may be one type alone, or two or more types in combination.

In the copolymer (A), the following content of carbonyl groups is from $1.5\times10^2$ to $1\times10^5$, preferably from $3\times10^2$ to $5\times10^4$, particularly preferably from $4.5\times10^2$ to $3\times10^4$. When the content of carbonyl groups is at least the lower limit value in the above range, adhesion to another material such as to a non-fluorinated thermoplastic resin will be excellent, and when it is at most the upper limit value, it becomes possible to maintain intrinsic electrical properties of a fluororesin, in addition to heat resistance and chemical resistance.

Content of carbonyl groups: the number of carbonyl groups to $1\times10^6$ carbon atoms as the number of carbon atoms in the molecular chain composed of repeating units in the fluorinated copolymer (copolymer (A)), determined by an IR absorption spectrum analysis using a Fourier transform infrared spectrometer.

In the measurement of the content of carbonyl groups, by using a film obtained by molding the fluorinated copolymer, an infrared absorption spectrum analysis is conducted by using a Fourier transform infrared spectrometer, to measure the absorption peak of C=O stretching vibration derived from carbonyl groups, and the content of the carbonyl groups is calculated from the measured value.

The position where the absorption peak of C=O stretching vibration appears, varies depending upon in what state a carbonyl group is present in the fluorinated copolymer (present as it is in the carbon chain or present as a carbonyl group-containing group in the carbon chain or carbon chain terminals). Therefore, the condition for calculating the content of carbonyl groups is set according to the state of a carbonyl group in the fluorinated copolymer.

Hereinafter, the calculation method for the content of carbonyl groups will be described in detail with respect to each of the case where carbonyl groups are derived from an acid anhydride group, the case where they are derived from a carbonate group, and the case where they are derived from a carbonyl fluoride group.

In a case where two or more types of carbonyl group-containing groups are present, the content of carbonyl groups shall be the total amount of carbonyl groups derived from the respective carbonyl group-containing groups.

Case where carbonyl groups are derived from an acid anhydride group:

A fluorinated copolymer is press-molded at a melting point+50° C., to prepare a film having a thickness of from 1.5 to 2.0 mm. The obtained film is subjected to an infrared absorption spectrum analysis using a Fourier transform infrared spectrometer, to measure the intensity of the absorption attributable to carbonyl groups appearing in the vicinity of 1870 cm$^{-1}$. The absorbance of an acid anhydride group is measured by using a molar absorbance coefficient of an acid anhydride group obtained from a model compound (maleic anhydride: 111 L·mol$^{-1}$·cm$^{-1}$, itaconic anhydride: 237 L·mol$^{-1}$·cm$^{-1}$). By the following formula (1), the number (N) of acid anhydride groups per 1×10$^6$ carbon atoms as the number of carbon atoms in the molecular chain composed of repeating units is calculated. Twice the value of calculated N is the content (the number) of carbonyl groups.

$$N = 500 A W / \epsilon d f \quad \text{Formula (1)}$$

A: absorbance of carbonyl group peak.

$\epsilon$: molar absorbance coefficient of carbonyl group [L·mol$^{-1}$·cm$^{-1}$].

W: composition average molecular weight calculated from monomer composition.

d: density of the film [g/cm$^3$].

f: thickness of the film [mm].

Here, the infrared absorption spectrum analysis shall be carried out by scanning 64 times, and the thickness of the film shall be measured by a micrometer. The same applies hereinafter.

Case where Carbonyl Groups are Derived from a Carbonate Group:

A white powder of a fluorinated copolymer is compression-molded at room temperature to prepare a film having a thickness of from 1.5 to 2.0 mm. The obtained film is subjected to an infrared absorption spectrum analysis using a Fourier transform infrared spectrometer, to measure the intensity of absorption attributable to carbonyl groups appearing in the vicinity of 1,809 cm$^{-1}$. The absorbance of a carbonate group is measured by using a molar absorbance coefficient (170 L·mol$^{-1}$·cm$^{-1}$) of a carbonate group obtained from a model compound. By the above formula (1), the number N of carbonate groups per 1×10$^6$ carbon atoms as the number of carbon atoms in the molecular chain composed of repeating units is calculated. The value of calculated N is the content (the number) of carbonyl groups.

Case where Carbonyl Groups are Derived from a Carbonyl Fluoride Group:

A white powder of a fluorinated copolymer is compression-molded at room temperature, to prepare a film having a thickness of from 1.5 to 2.0 mm. The obtained film is subjected to an infrared absorption spectrum analysis using a Fourier transform infrared spectrometer, to measure the intensity of the absorption attributable to a carbonyl group appearing in the vicinity of 1,880 cm$^{-1}$. The absorbance of carbonyl fluoride groups is measured by using a molar absorbance coefficient (600 L·mol$^{-1}$·cm$^{-1}$) of carbonyl fluoride groups obtained from a model compound. By the above formula (1), the number N of carbonyl fluoride groups per 1×10$^6$ carbon atoms as the number of carbon atoms in the molecular chain composed of repeating units is calculated. The value of calculated N is the content (the number) of carbonyl groups.

The copolymer (A) may have, in addition to carbonyl groups, at least one type of functional groups selected from the group consisting of hydroxy groups, epoxy groups, hydrolyzable silyl groups, amido groups, and amino groups.

These functional groups may be contained in main chain terminal groups of the copolymer (A) or may be contained in pendant groups, or may be contained in both of them.

The copolymer (A) comprises units derived from the following monomer (a) (hereinafter referred to also as "units (a)") and units derived from the following monomer (b) (hereinafter referred to also as "units (b)") and units derived from the following monomer (c) (hereinafter referred to also as "units (c)").

The copolymer (A) preferably further has units derived from the following monomer (d) (hereinafter referred to also as "units (d)").

The copolymer (A) preferably further has units derived from the following monomer (e) (hereinafter referred to also as "units (e)").

The copolymer (A) may have, as the case requires, units derived from the following monomer (f) (hereinafter referred to also as "units (f)").

Monomer (a):

Monomer (a) is tetrafluoroethylene.

As the copolymer (A) has units (a), the heat resistance, weather resistance, chemical resistance, gas barrier properties, fuel barrier properties, etc. of the copolymer (A), will be good.

Monomer (b):

Monomer (b) is ethylene.

As the copolymer (A) has units (b), the melt fluidity, mechanical properties (cracking resistance, abrasion resistance, toughness, flexibility, etc.), etc. of the copolymer (A), will be good.

Monomer (c):

Monomer (c) is a monomer having two or more polymerizable carbon-carbon double bonds.

As the copolymer (A) has units (c), elongation deformability of the copolymer (A) will be good.

As the monomer (c), a compound represented by the following formula (c1) is preferred.

$$Y^1 - R^f - Z^1 \quad (c1)$$

wherein $R^f$ is a fluoroalkylene group, and $Y^1$ and $Z^1$ are each independently, a vinyl group, a trifluorovinyl group or a trifluorovinyloxy group.

$R^f$ is, in view of good physical properties of the copolymer (A), preferably a fluoroalkylene group having from 1 to 8 carbon atoms. As the fluoroalkylene group, a polyfluoroalkylene group is preferred, and a perfluoroalkylene group is particularly preferred.

$R^f$ is, in view of good physical properties of the copolymer (A), preferably a perfluoroalkylene group having from 2 to 8 carbon atoms, more preferably a perfluoroalkylene group having from 4 to 8 carbon atoms, and in view of easy availability, particularly preferably a perfluoroalkylene group having 4 or 6 carbon atoms.

$Y^1$ and $Z^1$ are, in view of good copolymerizability, each preferably a vinyl group or a trifluorovinyloxy group. $Y^1$ and $Z^1$ are, in view of easy availability, preferably the same.

As the compound represented by formula (c1), for example, the following ones may be mentioned.

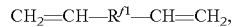
$CH_2=CH-R^{f1}-CH=CH_2$,

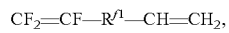
$CF_2=CF-R^{f1}-CH=CH_2$,

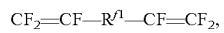
$CF_2=CF-R^{f1}-CF=CF_2$,

$CF_2=CF-O-R^{f1}-CH=CH_2$,

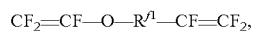
$CF_2=CF-O-R^{f1}-CF=CF_2$,

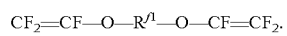
$CF_2=CF-O-R^{f1}-O-CF=CF_2$.

Here, $R^{f1}$ is a perfluoroalkylene group having from 2 to 8 carbon atoms.

Preferred embodiments of $R^{f1}$ are the same as the preferred embodiments of $R^f$.

As the monomer (c), one type may be used alone, or two or more types may be used in combination.

As the monomer (c), from the viewpoint of easy availability, preferred are the followings.

$$CH_2=CH-(CF_2)_{n1}-CH=CH_2,$$

$$CF_2=CF-O-(CF_2)_{n1}-O-CF=CF_2.$$

Here, n1 is an integer of from 4 to 8.

As the monomer (c), the following one is particularly preferred. In the following compound, polymerizable carbon-carbon double bonds are vinyl groups, and from the polymerizablity, the probability of being adjacent to units (a) is high, and the probability of being adjacent to units (b) is low. Thus, the possibility of hydrocarbon chains being arranged, is low, whereby the copolymer (A) becomes thermally stable.

$$CH_2=CH-(CF_2)_{n2}-CH=CH_2.$$

Here, n2 is 4 or 6.

Monomer (d):

Monomer (d) is a monomer having a carbonyl group and having a polymerizable carbon-carbon double bond.

When the copolymer (A) has units (d), carbonyl groups are introduced into the copolymer (A). Carbonyl groups in the copolymer (A) being derived from monomer (d) is preferred in that it is thereby possible to adjust the introduction amount of carbonyl groups at any proportion regardless of the molecular weight of the copolymer i.e. the adhesive strength can be optionally adjusted.

The monomer (d) may, for example, be a monomer having an acid anhydride group and a polymerizable carbon-carbon double bond (hereinafter referred to also as "monomer (d1)"), a monomer having a carboxy group and a polymerizable carbon-carbon double bond (hereinafter referred to also as "monomer (d2)"), an ester of a carboxylic acid having no polymerizable carbon-carbon double bond and a hydroxy compound having a polymerizable carbon-carbon double bond, an ester of a carboxylic acid having a polymerizable carbon-carbon double bond and a hydroxy compound having no polymerizable carbon-carbon double bond, $CF_2=CFOR^{f3}CO_2X^1$, etc.

Here, $R^{f3}$ is a $C_{1-10}$ perfluoroalkylene group, or a $C_{2-10}$ perfluoroalkylene group containing an oxygen atom between carbon-carbon atoms, and $X^1$ is a hydrogen atom or a $C_{1-3}$ alkyl group.

The monomer (d1) may, for example, be an acid anhydride of an unsaturated dicarboxylic acid, such as itaconic anhydride (hereinafter referred to also as "IAH"), citraconic anhydride (hereinafter referred to also as "CAH"), 5-norbornene-2,3-dicarboxylic acid anhydride (hereinafter referred to also as "NAH"), maleic anhydride, etc.

The monomer (d2) may, for example, be an unsaturated dicarboxylic acid such as itaconic acid, citraconic acid, 5-norbornene-2,3-dicarboxylic acid, maleic acid; etc.; an unsaturated monocarboxylic acid such as acrylic acid, methacrylic acid, etc.

The ester of a carboxylic acid having no polymerizable carbon-carbon double bond and a hydroxy compound having a polymerizable carbon-carbon double bond, may, for example, be a vinyl ester such as vinyl acetate, vinyl chloroacetate, vinyl butanoate, vinyl pivalate, vinyl benzoate, vinyl crotonate, etc.

The ester of a carboxylic acid having a polymerizable carbon-carbon double bond and a hydroxy compound having no polymerizable carbon-carbon double bond, may, for example, be a acrylate or methacrylate, such as a (polyfluoroalkyl) acrylate, a (polyfluoroalkyl) methacrylate, etc.

As the monomer (d), one type may be used alone, or two or more types may be used in combination.

As the monomer (d), the monomer (d1) is preferred from the viewpoint of thermal stability. Among them, at least one member selected from the group consisting of IAH, CAH and NAH is particularly preferred. When at least one member selected from the group consisting of IAH, CAH and NAH, is used, it is possible to easily produce a fluorinated copolymer containing acid anhydride groups without necessity of employing a special polymerization method (see JP-A-11-193312) which is required in the case of using maleic anhydride.

Monomer (e):

Monomer (e) is hexafluoropropylene.

As the content of units (e) in the copolymer (A) increases, the melting point of the copolymer (A) tends to be low. Therefore, when the copolymer (A) contains units (e), it is possible to easily adjust the melting point of the copolymer (A) within the above range by the content of units (e).

Monomer (f):

Monomer (f) is a monomer other than the monomer (a), the monomer (b), the monomer (c), the monomer (d) and the monomer (e).

A polymerizable carbon-carbon double bond which the monomer (f) may have, is preferably one.

The monomer (f) may, for example, be a hydrocarbon type olefin (excluding ethylene), a fluoroolefin having a hydrogen atom on an unsaturated group, a fluoroolefin having no hydrogen atom on an unsaturated group (excluding tetrafluoroethylene and hexafluoropropylene), a perfluoro(alkyl vinyl ether), a vinyl ether, etc.

The hydrocarbon type olefin (excluding ethylene) may, for example, be propylene, butene, etc.

The fluoroolefin having a hydrogen atom on an unsaturated group may, for example, be vinylidene fluoride, vinyl fluoride, trifluoroethylene, a compound represented by the following formula (f1) (hereinafter referred to also as "monomer (f1)"), etc.

$$CH_2=CX^2(CF_2)_{n3}Y^2 \quad (f1)$$

wherein $X^2$ and $Y^2$ are each a hydrogen atom or a fluorine atom, and n3 is an integer of from 2 to 10.

Specific examples of the monomer (f1) may, for example, be $CH_2=CF(CF_2)_{n3}F$, $CH_2=CF(CF_2)_{n3}H$, $CH_2=CH(CF_2)_{n3}F$, $CH_2=CH(CF_2)_{n3}H$, etc. n3 is as defined above.

The fluoroolefin having no hydrogen atom in an unsaturated group (excluding tetrafluoroethylene and hexafluoropropylene) may, for example, be chlorotrifluoroethylene, etc.

The perfluoro(alkyl vinyl ether) may, for example, be a compound represented by the following formula (f2) (hereinafter referred to also as "monomer (f2)"), etc.

$$CF_2=CFOR^{f4} \quad (f2)$$

wherein $R^{f4}$ is a $C_{1-10}$ perfluoroalkyl group, or a $C_{2-10}$ perfluoroalkyl group containing an oxygen atom between carbon atoms.

Specific examples of the monomer (f2) may, for example, be $CF_2=CFO(CF_2)_2F$, $CF_2=CFO(CF_2)_3F$, $CF_2=CFO(CF_2)_4F$, $CF_2=CFO(CF_2)_8F$, etc.

The vinyl ether may, for example, be an alkyl vinyl ether, a (fluoroalkyl) vinyl ether, glycidyl vinyl ether, hydroxybutyl vinyl ether, methyl vinyloxy butyl carbonate, etc.

As the monomer (f), one type may be used alone, or two or more types may be used in combination.

As the monomer (f), the monomer (f1) is preferred. When the copolymer (A) has units derived from monomer (f1) (hereinafter referred to also as "units (f1)"), mechanical properties such as cracking resistance, etc. the production efficiency of the copolymer (A), etc., will be good.

$X^2$ in the monomer (f1) is preferably a hydrogen atom, from the viewpoint of easy availability.

$Y^2$ in the monomer (f1) is preferably a fluorine atom, from the viewpoint of thermal stability.

n3 in the monomer (f1) is preferably an integer of from 2 to 6, more preferably from 2 to 4, from the viewpoint of the physical properties of the copolymer (A1).

As the monomer (f1), $CH_2=CF(CF_2)_{n4}F$, $CH_2=CF(CF_2)_{n4}H$, $CH_2=CH(CF_2)_{n4}F$, $CH_2=CH(CF_2)_{n4}H$, etc. are preferred. Here, n4 is an integer of from 2 to 6.

As the monomer (f1), $CH_2=CH(CF_2)_{n4}F$ and $CH_2=CF(CF_2)_{n4}H$ are more preferred, and $CH_2=CH(CF_2)_2F$, $CH_2=CH(CF_2)_4F$, and $CH_2=CF(CF_2)_3H$ are particularly preferred.

As the copolymer (A), a copolymer of the monomer (a), the monomer (b), the monomer (c1), the monomer (d1), the monomer (e) and the monomer (f1) (hereinafter referred to also as "copolymer (A1)") is preferred.

The copolymer (A1) may have a functional group such as an alkoxycarbonyl group, an alkoxycarbonyloxy group, a hydroxy group, a carboxy group, a carbonyl fluoride group, etc., at a terminal of the molecular chain composed of repeating units, Composition:

In the copolymer (A), the molar ratio of units (a) to units (b) (i.e. units (a)/units (b)) is from 30/70 to 70/30, preferably from 33/67 to 67/33, particularly preferably from 36/64 to 64/36. When units (a)/units (b) is at least the lower limit value in the above range, heat resistance will be good, and when it is at most the upper limit value, mechanical strength will be good.

The total content of units (a) and units (b) in the copolymer (A) is from 80 to 99.995 mol %, preferably from 81 to 99 mol %, particularly preferably from 83 to 97 mol %, based on the total of all units. When the total content of units (a) and units (b) is at least the lower limit value in the above range, productivity (polymerization) and heat resistance will be excellent, and when it is at most the upper limit value, other units may be sufficiently incorporated, and the effect of such other units will be sufficiently obtained.

The content of units (c) in the copolymer (A) is preferably from 0.02 to 0.15 mol %, more preferably from 0.02 to 0.10 mol %, further preferably from 0.03 to 0.10 mol %, particularly preferably from 0.03 to 0.07 mol %, based on the total of all units. When the content of units (c) is at least the lower limit value in the above range, the melt tension becomes sufficiently high and elongation deformability will be excellent, and when it is at most the upper limit value, mechanical properties such as cracking resistance, etc., melt moldability, etc. will be excellent.

In a case where the copolymer (A) contains units (d), the content of units (d) in the copolymer (A) is preferably from 0.03 to 10 mol %, preferably from 0.06 to 5 mol %, particularly preferably from 0.1 to 3 mol %, based on the total of all units. When the content of units (d) is at least the lower limit value in the above range, adhesion to another material such as to a non-fluorinated thermoplastic resin will be excellent, and when it is at most the upper limit value, it is possible to maintain the physical properties themselves of the fluororesin.

In a case where the copolymer (A) contains units (e), the content of units (e) in the copolymer (A) is preferably from 4 to 19 mol %, more preferably from 5 to 19 mol %, particularly preferably from 6 to 18 mol %, based on the total of all units. When the content of units (e) is at least the lower limit value in the above range, the melting point of the copolymer (A) tends to be at most 230° C., and when it is at most the upper limit value, melt moldability will be excellent.

In a case where the copolymer (A) has units (f), the content of units (f) is preferably from 0.1 to 15 mol %, more preferably from 0.2 to 10 mol %, particularly preferably from 0.3 to 7 mol %, based on the total of all units.

In a case where the copolymer (A) has units (f1), the content of units (f1) is preferably from 0.1 to 15 mol %, more preferably from 0.2 to 10 mol %, particularly preferably from 0.3 to 8 mol %, based on the total of all units.

When the content of units (f) is at least the lower limit value in the above range, the physical properties brought about by units (f) will be remarkable (e.g. transparency, flexibility, stress cracking resistance, etc. will be excellent), and when it is at most the upper limit value, it is possible to express the physical properties brought about by units (f) without impairing heat resistance.

Melting Point:

The melting point of the copolymer (A) is from 120 to 230° C., preferably from 140 to 200° C.

When the melting point of the copolymer (A) is at most the upper limit value in the above range, melt moldability of the copolymer (A) is good. Further, for example, in the case of forming a laminate by laminating the copolymer (A) and a non-fluorinated thermoplastic resin under heating by a means such as melt-molding, hot pressing, etc., it is possible to obtain a laminate without bringing about thermal decomposition, etc. of the non-fluorinated thermoplastic resin.

When the melting point of the copolymer (A) is at least the lower limit value in the above range, mechanical properties of the copolymer (A) will be good. Further, at the time of forming a laminate as described above, the layer of the copolymer (A) and the layer of the non-fluorinated thermoplastic resin will be bonded with a strong adhesive force by the heat in forming the laminate.

The melting point of the copolymer (A) may be adjusted by the types or contents of units constituting the copolymer (A), the molecular weight, etc. For example, as the ratio of units derived from the monomer (a) is increased, the melting point tends to be high.

X/W:

The ratio (X/W) of the melt tension X (N) of the copolymer (A) to the load W (N) for measuring the melt tension X, is from $0.5 \times 10^{-4}$ to $2.0 \times 10^{-4}$ [N/N], more preferably from $0.6 \times 10^{-4}$ to $1.8 \times 10^{-4}$ [N/N], particularly preferably from $0.7 \times 10^{-4}$ to $1.7 \times 10^{-4}$ [N/N]. When X/W is at least the lower limit value in the above range, elongation deformability will be excellent, and when it is at most the upper limit value, mechanical properties, adhesion to another material such as to a non-fluorinated thermoplastic resin, etc. will be excellent.

X/W can be adjusted by the content of units (c), the concentration of the chain transfer agent during polymerization, etc. For example, when the content of units (c) is in the above mentioned range, there is a tendency that X/W increases, as the content of units (c) is large.

Volume Flow Rate:

The following volume flow rate (hereinafter referred to also as "Q value") of the copolymer (A) is preferably from 0.5 to 100 mm$^3$/sec., more preferably from 1 to 70 mm$^3$/sec., particularly preferably from 2 to 40 mm$^3$/sec.

Volume flow rate: extrusion rate (mm³/sec.) at the time of extruding a fluorinated copolymer from an orifice having a diameter of 2.1 mm and a length of 8 mm under a pressure of 68.7N/cm² at a temperature of the melting point+50° C.

The Q value is an index representing the melt flowability of a resin and will be an index for the molecular weight. That is, the larger the Q value, the lower the molecular weight, and the smaller the Q value, the higher the molecular weight.

When the Q value is at least the lower limit value in the above range, melt moldability will be excellent, and when it is at most the upper limit value, mechanical properties will be excellent.

MIT Flex Number:

The MIT flex number which is measured in accordance with ASTM D-2176, of the copolymer (A), is preferably at least 1,000 times, more preferably at least 2,000 times.

When the MIT flex number is at least the lower limit value in the above range, mechanical properties such as cracking resistance, etc. will be excellent, and for example, even if a layer of the copolymer (A) is repeatedly bent, the material is less likely to be broken.

The MIT flex number may be adjusted by the content of units (c), the presence or absence, or the content, of units (e), etc. For example, when the content of units (c) is within the above range, the MIT flex number tends to increase, as the content of units (c) is smaller.

(Method for Producing Copolymer (A))

As the method for producing the copolymer (A), the following (1) to (3) may, for example, be mentioned.

(1) A method of polymerizing the monomer (a), the monomer (b), the monomer (c), the monomer (d), and, as the case requires, other monomers (the monomer (e) and the monomer (f)).

(2) A method of polymerizing the monomer (a), the monomer (b), the monomer (c), and, as the case requires, other monomers (the monomer (e) and the monomer (f)) in the presence of a radical polymerization initiator having a carbonyl group, or a chain transfer agent having a carbonyl group.

(3) A method of polymerizing the monomer (a), the monomer (b), the monomer (c) and, as the case requires, other monomers (the monomer (e) and the monomer (f)), and graft-polymerizing, to the obtained copolymer, the monomer (d).

As the method for producing the copolymer (A), the methods of (1) and (2) are preferred.

In the method of (1), the polymerization method of monomers is not particularly limited, and for example, a method using a radical polymerization initiator is used. At the time of this polymerization, a chain transfer agent may be used. Further, as the radical polymerization initiator, a radical polymerization initiator having a carbonyl group may be used.

As the radical polymerization initiator, the temperature at which its half-life is 10 hours, is preferably from 0 to 100° C., more preferably from 20 to 90° C. Specific examples include an azo compound such as azobisisobutyronitrile, etc., a non-fluorinated diacyl peroxide such as isobutyryl peroxide, octanoyl peroxide, benzoyl peroxide, lauroyl peroxide, etc., a peroxydicarbonate such as diisopropyl peroxy dicarbonate, etc., a peroxy ester such as tert-butyl peroxypivalate, tert-butyl peroxy isobutyrate, tert-butyl peroxy acetate, etc., a fluorinated diacyl peroxide such as a compound represented by $(Z(CF_2)_rCOO)_2$ (wherein Z is a hydrogen atom, a fluorine atom or a chlorine atom, and r is an integer of from 1 to 10), an inorganic peroxide such as potassium persulfate, sodium persulfate, ammonium persulfate, etc.

The polymerization method may, for example, be bulk polymerization, solution polymerization using an organic solvent such as a fluorinated hydrocarbon, a chlorinated hydrocarbon, a fluorinated chlorinated hydrocarbon, an alcohol, a hydrocarbon, etc., suspension polymerization using an aqueous medium and a suitable organic solvent as the case requires, emulsion polymerization using an aqueous medium and an emulsifier, etc. Preferred is a solution polymerization.

The polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time may be varied depending upon the polymerization temperature, polymerization pressure, etc., but, it is preferably from 1 to 30 hours.

In a case where the monomers (d1) is used as the monomer (d), the concentration of the monomer (d1) during the polymerization, is preferably from 0.03 to 10 mol %, more preferably from 0.06 to 5 mol %, particularly preferably from 0.1 to 3 mol %, based on the total of all monomers. When the concentration of the monomer (d1) is within the above range, the polymerization rate is excellent. If the concentration of the monomer (d1) is too high, the polymerization rate tends to decrease.

During the polymerization, as the monomer (d1) is consumed by the polymerization, the amount consumed is preferably supplied continuously or intermittently into the polymerization reactor to maintain the concentration of the monomer (d1) within the above range.

During the polymerization, in order to control the Q value, it is possible to use a chain transfer agent.

The chain transfer agent may, for example, be an alcohol such as methanol, ethanol, etc., a chlorofluorohydrocarbon such as 1,3-dichloro-1,1,2,2,3-pentafluoropropane, 1,1-dichloro-1-fluoroethane, etc., a hydro-carbon such as pentane, hexane, cyclohexane, etc.

In the method of (2), a carbonyl group derived from a radical polymerization initiator or chain transfer agent is introduced into a terminal portion in a carbon chain composed of repeating units.

Polymerization in the method of (2) may be carried out in the same manner as in the method of (1) except that it is essential to conduct it in the presence of a radical polymerization initiator having a carbonyl group, or a chain transfer agent having a carbonyl group.

The radical polymerization initiator having a carbonyl group may, for example, be the above-mentioned diacyl peroxide, peroxyester, peroxydicarbonate, etc. In particular, a peroxydicarbonate such as diisopropyl peroxydicarbonate or di-n-propyl peroxydicarbonate is preferred.

Further, in the case of a radical polymerization initiator having a carbonyl group, depending upon conditions such as the type, decomposition temperature, etc. of the radical polymerization initiator, carbon dioxide may be detached at the time of the decomposition to form a radical having no carbonyl group. In such a case, in the obtained copolymer, a carbonyl group derived from a radical polymerization initiator will not be present.

The chain transfer agent having a carbonyl group may, for example, be a chain transfer agent having a functional group such as an ester group, a carbonate group, a hydroxy group, a carboxy group, a carbonyl fluoride group, etc. Specifically, a carboxylic acid or its derivative, such as acetic acid, acetic anhydride or methyl acetate may be mentioned.

Advantageous Effects

The copolymer (A) as described above has carbonyl groups and thus is capable of exhibiting excellent adhesion to a material other than a fluororesin, for example, to a non-fluorinated thermoplastic resin.

Further, since the melting point is within the above range, melt-moldability and mechanical properties are good. Further, in the case of forming a laminate by laminating the copolymer (A) and a non-fluorinated thermoplastic resin under heating by a means such as melt-molding or hot pressing, it is possible to obtain a laminate without thermal decomposition, etc. of the non-fluorinated thermoplastic resin, and the obtainable laminate will be excellent in interlayer adhesion.

Further, units (c) will be branch points of the carbon chain composed of repeating units. When the copolymer (A) has units (c) in such a content that X/W will be in the above-mentioned range, a very small amount of branched structures will be introduced into the copolymer (A). As such branched structures are introduced, the copolymer (A) has a high melt tension and is excellent in elongation deformability. Further, as the amount of branched structures introduced is very small, the copolymer (A) has a high melt flowability and is excellent in melt moldability. If the amount of branched structures introduced increases, there may be a concern that it is likely to become brittle, and mechanical properties such as cracking resistance, etc. are likely to be low, but as the amount of the branched structure introduced is very small, mechanical properties are good.

(Applications)

Applications of the copolymer (A) are not particularly limited. From the viewpoint of the above-mentioned advantageous effects, the copolymer (A) is preferably used in applications to produce a variety of articles by laminating it with another material.

Another material may, for example, be a fluororesin other than the copolymer (A), a non-fluorinated thermoplastic resin, a metal (iron, stainless steel, aluminum, etc.), glass, ceramics, etc. From the viewpoint of usefulness of the present invention, a non-fluorinated thermoplastic resin is preferred.

The thermoplastic resin in the present invention is meant to include a thermoplastic elastomer in addition to a usual thermoplastic resin.

As the non-fluorinated thermoplastic resin, the following ones may, for example, be mentioned.

Usual non-fluorinated thermoplastic resins include a polyolefin resin such as polyethylene (high density polyethylene, medium density polyethylene, low density polyethylene, ultra low density polyethylene), polypropylene, polybutene, polybutadiene, an α-olefin-ethylene copolymer, etc.; a polyester resin such as polybutylene terephthalate, polyethylene terephthalate, polyethylene isophthalate, polyethylene naphthalate, etc.; a polyurethane resin such as thermoplastic polyurethane, etc.; a polyvinyl acetate resin such as polyvinyl acetate, an ethylene/polyvinyl acetate copolymer, etc.; a polyvinyl alcohol resin such as polyvinyl alcohol, a vinyl alcohol/ethylene copolymer, etc.; a polyvinyl chloride resin such as polyvinyl chloride, polyvinylidene chloride, a vinyl chloride/vinylidene chloride copolymer, etc.; a polyacrylate resin such as polymethyl acrylate, polyethyl acrylate, etc.; a polymethacrylate resin such as polymethyl methacrylate, polyethyl methacrylate, etc.; a polystyrene resin such as polystyrene, poly α-methylstyrene, etc.; a polynitrile-type resin such as polyacrylonitrile, polymethacrylonitrile, an acrylonitrile/styrene copolymer, a methacrylonitrile/styrene copolymer, a methacrylonitrile/styrene/butadiene copolymer, etc.; a polyamide resin such as nylon 11, nylon 12, nylon 610, nylon 612, nylon 66, nylon 46, etc.; a polyimide resin such as polyimide, polycarbonate, polyether ether ketone, polyetherimide, polyether ketone, polyether sulfone, polythioether sulfone, polyether nitrile, polyphenylene ether, etc.

As the non-fluorinated thermoplastic elastomer, a polyether-type or polyester-type polyurethane thermoplastic elastomer; a polyolefin thermoplastic elastomer such as an ethylene/propylene copolymer, an ethylene/propylene/diene copolymer, etc.; a polyester thermoplastic elastomer; a polystyrene-type thermoplastic elastomer such as a styrene/ethylene/butylene block copolymer, a styrene/ethylene/propylene block copolymer, a styrene/isoprene copolymer, etc.; a polyamide thermoplastic elastomer, etc. may be mentioned.

Among the above non-fluorinated thermoplastic resins, a polyurethane-type thermoplastic resin or thermoplastic elastomer, a polyester-type thermoplastic resin or thermoplastic elastomer, or a polyolefin-type thermoplastic resin or thermoplastic elastomer, is preferred.

The melting point of the non-fluorinated thermoplastic resin is preferably from 120 to 230° C., particularly preferably from 140 to 200° C. In the case of a non-fluorinated thermoplastic resin, of which the melting point is not clear, in place of the melting point, the flow starting temperature is preferably in this range.

Here, the flow starting temperature is a temperature at which, when an orifice with a diameter of 2.1 mm and a length of 8 mm is set on a flow tester manufactured by Shimadzu Corporation, then, a thermoplastic resin of interest is filled, and while exerting a load of 7 kg, the thermoplastic resin is heated, the thermoplastic resin begins to flow out from the orifice.

The non-fluorinated thermoplastic resin preferably has a functional group capable of reacting with a carbonyl group to form a chemical bond (hereinafter referred to also as a "reactive functional group").

The reactive functional group may, for example, be an amino group, an isocyanate group, a hydroxy group, an epoxy group, an alkoxycarbonyl group, etc. and an amino group or an epoxy group is preferred. The reactive functional group of the non-fluorinated thermoplastic resin may be one type, or two or more types.

As the non-fluorinated thermoplastic resin having a reactive functional group, a commercial product may be used, or one produced by a known production method may be used.

As the article obtainable by laminating the copolymer (A) and another material, the following multi-layer laminate is preferred.

A multilayer laminate comprising a laminate [(I)/(II)] wherein a layer (I) containing the copolymer (A) and a layer (II) containing a non-fluorinated thermoplastic resin (hereinafter referred to also as "resin (B)") having a reactive functional group, are directly bonded.

The resin (B) and the reactive functional group of the resin (B), may be the same as those described above.

The layer (I) may be a layer composed solely of the copolymer (A), or a layer further containing a component other than the copolymer (A). The component other than the copolymer (A) may, for example, be a melt-moldable fluororesin other than the copolymer (A), a melt-moldable synthetic resin other than a fluororesin, an additive other than a resin, etc. The melt-moldable fluororesin other than the copolymer (A), is preferably a fluorinated copolymer having the same composition as the above copolymer (A) except for not containing units (c). The melt-moldable synthetic resin other than a fluororesin, is preferably a heat-resistant polymer. The additive other than a resin may be a powdery filler, a reinforced fiber, a stabilizer, etc. Particularly preferred is a heat-resistant polymer such as polyimide, polyphenylene sulfide (PPS), etc., a filler, of which raw material is a conductive powder material such as carbon black, such as titanium oxide, a carbon fiber, a copper-type stabilizer such as copper powder, copper oxide, copper iodide, etc.

The layer (II) may be a layer made solely of the resin (B), or may be a layer further containing a component other than the resin (B).

The laminate [(I)/(II)] is preferably one having the layer (I) and the layer (II) bonded by heating, i.e. heat-laminated.

In a case where the laminate [(I)/(II)] is formed by heat lamination, the laminate [(I)/(II)] will be a laminate having layers very strongly bonded. This is considered to be such that carbonyl groups in the copolymer (A) forming the layer (I) and reactive functional groups (amino groups, epoxy groups, etc.) in the resin (B) forming the layer (II), are reacted and bonded at the lamination interface at the time of lamination under heating.

The multilayer laminate may further contain a layer made of a resin other than the copolymer (A) and the resin (B).

The laminate [(I)/(II)] has, in particular in the layer (II), reactive functional groups such as amino groups, epoxy groups, etc. in the resin (B), and thus has good adhesion to many other resins, particularly to thermoplastic resins. Therefore, when a layer (III) made of another resin is heat-laminated on the layer (II) of the laminate [(I)/(II)], both layers will be firmly bonded, whereby it is possible to form a multilayer laminate [(I)/(II)/(III)] having three layers strongly bonded to one another. Further in the same manner, it is possible to form a multi-layer laminate of four or more layers, such as [(I)/(II)/(III)/(IV)], [(I)/(II)/(III)/(IV)/(V)], etc. including the laminate [(I)/(II)]. In this manner, by laminating desired thermoplastic resin(s) on the laminate [(I)/(II)] as the base, it is possible to form a multilayer laminate excellent in mechanical strength and chemical liquid barrier properties, easily at low cost.

As such other resins, thermoplastic resins are preferred. The thermoplastic resins are not particularly limited, and any thermoplastic resins may be selected for use depending on the purpose. For example, a single substance such as polyethylene (high density polyethylene, medium density polyethylene, low density polyethylene, ultra low density polyethylene), polypropylene, polybutene, polybutadiene, an ABS resin, polystyrene, a methacrylic resin, a norbornene resin, polyvinyl chloride, polyvinylidene chloride, a polyester such as polybutylene terephthalate, polyethylene terephthalate, polyethylene naphthalate, etc., polycarbonate, polyamide, polyimide, thermoplastic polyimide, polyaminobismaleimide, polysulfone, phenylene sulfide, polyether ether ketone, polyether imide, polyether ketone, polyether sulfone, polythioether sulfone, polyether nitrile, polyphenylene ether, or a mixture of such single substances, or a mixture of carbon black, a various elastomeric component, glass fiber, carbon fiber, etc. using such a single substance or a mixture as a matrix, may be mentioned. By using such other resins, as the layers (III), (IV), (V) . . . , it is possible to form a multilayer laminate.

The thickness of the layer (I) is preferably from 5 μm to 5,000 μm, more preferably from 50 μm to 500 μm.

The thickness of the layer (II) is preferably from 5 μm to 1.5 cm, more preferably from 50 μm to 1 cm.

The thickness of the overall multi-layer laminate can be arbitrarily set depending on the purpose, but is usually preferably from 10 μm to 2 cm, more preferably from 50 μm to 1 cm.

The shape of the multi-layer laminate is not particularly limited, and may, for example, be various shapes such as films, sheets, belts, tubes, hoses, tanks, bottles, etc.

As a method for producing the multilayer laminate, from the viewpoint of molding efficiency and productivity, it is possible to suitably apply a method including thermal lamination, such as multi-layer extrusion (co-extrusion molding), extrusion lamination molding, lamination molding using a heating roll, a heat press, etc., multilayer injection molding, multilayer blow molding, etc.

The thermal lamination is preferably carried out by multilayer extrusion molding, multilayer injection molding, multilayer blow molding, melt molding such as heat fusion between films, etc., and it is particularly preferably carried out by multilayer extrusion molding.

In the multilayer extrusion molding, the copolymer (A), the resin (B) and, as the case requires, other thermoplastic resins, are discharged from discharge ports of different extruders and passed through a die while being contacted with one another in a molten state, whereby it is possible to obtain a multi-layer laminate including a laminate [(I)/(II)].

It is also possible to form a laminate [(I)/(II)] by melt molding such as multi-layer extrusion molding, and then to heat press e.g. a layer (III) thereto, to obtain e.g. a laminate [(I)/(II)/(III)].

The temperature at the time of thermal lamination is preferably from 200 to 310° C., more preferably from 230 to 330° C. When the temperature at the time of thermal lamination is at least the lower limit value in the above range, the adhesive force based on the reaction of carbonyl groups and reactive functional groups will be sufficiently expressed. When the temperature at the time of thermal lamination is at most the upper limit value in the above range, it is possible to prevent thermal decomposition or modification of a thermoplastic resin such as the resin (B), or coloration, etc. of the resin.

The copolymer (A) may be molded by a known molding method such as injection molding, extrusion molding, blow molding, press molding, rotational molding, electrostatic coating, etc. The shape of the obtained molded product may, for example, be a sheet-form, a fiber-form, a film-form, etc. and is not particularly limited. Further, fibers may, for example, be monofilaments, multifilaments, etc., and their shape is not particularly limited. Further, it is possible to stretch the obtained molded product to form a porous body. Further, it is also possible to form a coating on the obtained molded product, or to form a laminate structure with another resin, etc.

The fibers obtained from the above molded product, may be made into a cloth such as a fabric, a non-woven fabric, a felt, a knitted fabric, etc. The obtained cloth may be used, not only as it is, for clothing, but also as a base material for a composite laminate for protective apparels, etc. or for electrolytic films, etc. When used as the base material, it is preferably a porous material.

Specific applications of the molded product may, for example, be, in the case of garments, etc., a thermostable convective barrier of a flexible fabric composite to be used for e.g. a fire-resistant protective clothing as described in JP-A-2012-525288, a porous support layer of a durable chemical protective material to be used in a chemical protection suit as described in JP-A-2012-519535, a laminate on an outer film surface of a single wall lightweight tent structure as described in JP-A-2012-526937, etc.

Further, the base material for a film, etc. may, for example, be a porous support for a membrane of a membrane electrode assembly to be used for a fuel cell or electrolytic cell as described in JP-A-2014-005471, a non-conductive base material for antistatic coating or a cable containing such a non-conductive layer to be used for clothes, etc. as described in JP-A-2014-513734, or a stretched fluoropolymer having a hydrophilic coating formed, to be used in a medical device such as an electronic wire or cable as described in JP-A-2014-525847. Further, fibers obtained from the molded product may be used for applications as described in paragraphs [0017], [0018], etc. of JP-A-2012-512770.

EXAMPLES

Now, the present invention will be described in detail with reference to Examples. However, the present invention is not limited by the following description.

The evaluation methods used in each of the following Examples, are shown below.

[Evaluation Methods]
<Composition of Fluorinated Copolymer>

The molar ratios of the respective units in a fluorinated copolymer were obtained from the melt NMR measurements and the total fluorine content measurements. However, since the content (mol %) of units (c) is so small that it is difficult to measure it by the above methods, and therefore, it was measured using a pyrolysis gas chromatography. From these results, the composition (contents of respective units) of the fluorinated copolymer was determined.

It should be noted that the name of units derived from each monomer will be represented by the compound name or its abbreviation followed by "units". For example, units derived from tetrafluoroethylene (abbreviation: TFE) will be represented by "TFE units".

<Melting Point>

The melting point (° C.) of a fluorinated copolymer was determined from the endothermic peak at the time of heating at a rate of 10° C./min up to 300° C. in the air atmosphere by means of a scanning differential thermal analyzer (DSC220CU manufactured by Seiko Instruments Inc.).

<Q Value (mm³/sec.)>

Using a flow tester (manufactured by Shimadzu Corporation), the extrusion rate (mm³/sec.) at the time of extruding a fluorinated copolymer from an orifice having a diameter of 2.1 mm and a length of 8 mm under a pressure of 68.7N/cm² at a temperature of the melting point of the fluorinated copolymer+50° C., was measured and the measured value was adopted as the Q value.

<Content of Carbonyl Groups>

With respect to carbonyl groups of the fluorinated copolymer obtained in each Example, the content of carbonyl groups was measured by the following procedure. Here, carbonyl groups of the copolymer obtained in each of Example 1 to Comparative Example 3 have carbonyl groups derived from the carbonate group of the radical polymerization initiator, and carbonyl groups of the copolymer obtained in each of Example 3 to Comparative Example 5 have carbonyl groups derived from an unsaturated dicarboxylic acid anhydride (tert-butyl peroxypivalate does not have a carbonyl group derived from the radical polymerization initiator, since carbon dioxide is detached therefrom at the time of decomposition).

The fluorinated copolymer was press-molded at the melting point+50° C., to prepare a film having a thickness of from 1.5 to 2.0 mm. The obtained film was subjected to an infrared absorption spectrum analysis by using a Fourier transform infrared spectrometer (AVATAR 360 manufactured by Nicolet Co.), to measure the intensity of absorption attributable to carbonyl groups appearing in the vicinity of 1,870 $cm^{-1}$. The absorbance of the carbonyl groups was measured by using the molar absorbance coefficients of acid anhydride groups and carbonate groups obtained from a model compound (IAH: 237 $L·mol^{-1}·cm^{-1}$, carbonate groups: 170 $L·mol^{-1}·cm^{-1}$). By the following equation (1), the number (N) of carbonyl groups per $1×10^6$ carbon atoms of the number of carbon atoms in the molecular chain composed of repeating units, was calculated. Twice the value of calculated N was adopted as the content (the number) of carbonyl groups.

$$N = 500AW/\epsilon df \qquad \text{Formula (1)}$$

A: absorbance of carbonyl group peak.
$\epsilon$: molar absorbance coefficient of carbonyl group [$L·mol^{-1}·cm^{-1}$].
W: composition average molecular weight calculated from monomer composition.
d: density of the film [$g/cm^3$].
f: thickness of the film [mm].

<X/W>

Measurement of the melt tension X was carried out in accordance with the following procedure by means of a capillograph (manufactured by Toyo Seiki Seisakusho, Ltd.) by using a cone-equipped die having a diameter of 1 mm and a length 10 mm with an inlet angle of 90 degrees.

The fluorinated copolymer was press-molded at 300° C. to prepare a sheet having a thickness of 1 mm. The sheet was finely cut into squares of about 5 mm, and 5 g of the finely cut sample was put into a barrel set at 300° C. Then, a piston was inserted from above and left to stand for 5 minutes until the fluorinated copolymer was melted and the barrel temperature was stabilized at 300° C. Then, the piston was lowered at a speed of 5 mm/min, and waited until the load applied to the piston became constant, and after the load became constant, the take-up speed of a take-up device was adjusted to be 2 m/min, and a strand of the copolymer flowed out from the die was slowly led to the take-up device so as not to break the strand, whereby the strand was withdrawn. The withdrawal strength applied at that time was measured for one minute. With respect to the measured withdrawal strength, an average value during the measurement period was calculated, and the calculated value was adopted as the melt tension X (mN).

From the melt tension X and the load W (N) at the time when the load applied to the piston became constant during the measurement, the value of X/W [N/N] was calculated.

<Uniformity of Strand Diameter>

Using a capillograph (manufactured by Toyo Seiki Seisakusho), from a die having a diameter of 2 mm and a length of 10 mm, at a piston speed of 5 mm/min, the fluorinated copolymer was extruded at a temperature of the melting point+50° C., and the strand was withdrawn at a take-up speed of 1 m/min. At that time, a case where the thickness of the strand diameter periodically changes and the change rate exceeds 10%, was evaluated as non-uniform (x), and a case where the change rate is less than 10%, was evaluated as uniform (○). In addition, a case where there is roughness on the strand surface, was regarded as non-uniform (x) in the evaluation of uniformity of strand diameter. With one having higher uniformity of strand diameter, the degree of extension by its own weight at the time of melting is smaller, such being suitable for a mold processing method involving elongation deformation such as blow molding.

<MIT Flex Number>

The fluorinated copolymer was press-molded at the melting point+50° C. to prepare a film having a thickness of 0.23 mm, and the film was punched out into a strip shape of 12.5 mm in width×130 mm in length to prepare a test specimen.

In accordance with ASTM D-2176, a MIT bending test of the test specimen was carried out, and the MIT flex number was measured. That is, the test specimen was mounted on a MIT measuring instrument manufactured by Toyo Seiki Seisakusho, and the test specimen was bent under conditions of a load of 12.3N, a bending angle of 135 degrees at each of left and right, and the bending number of times being 175 times/min., and the number of times (the MIT flex number) until the test specimen underwent breakage, was measured.

This test is a bending fatigue resistance test, and the MIT flex number becomes an index for cracking resistance of the fluorinated copolymer. The larger the MIT flex number, the better the cracking resistance.

<Adhesive Strength (Press→Heat Sealing→Peel Test)>

The fluorinated copolymer was press-molded to prepare a film having a thickness of 100 μm, and the film was punched out into a strip shape of 1 cm in width×10 cm in length to prepare a sample for measurement.

The measurement sample obtained, and a nylon film having the same size (nylon 12, manufactured by Ube Industries, Ltd., Grade: 3030J16L, thickness: 200 μm), were laminated and melt-bonded by an impulse heat sealer (manufactured by Fuji Impulse Co., Ltd.) set at a heating level 7 (270° C.) for 15 seconds to obtain a laminated film. The obtained laminated film was cut into a strip shape of 5 cm in length and 1 cm in width, to produce a test specimen. An end portion of the test specimen was fixed to a chuck of a tensile tester (manufactured by Orientec Co., Ltd.), and the peel strength (N/cm) when peeled at 180° was measured.

Example 1

A polymerization tank having an internal volume of 4 L and equipped with a stirrer, was deaerated, and 1 L of deoxygenated water, 400 g of perfluorocyclobutane and 800 g of hexafluoropropylene (hereinafter referred to as "HFP") were put, whereupon the internal temperature was kept at 35° C. and the stirring speed was kept at 600 rpm. Further, 2.0 g of perfluoro(1,1,5-trihydro-1-pentene) (hereinafter referred to as "PTHP") represented by $CH_2=CF(CF_2)_3H$, 0.108 g of $CH_2=CH-(CF_2)_6-CH=CH_2$ (hereinafter referred to as "C6-DV") and 0.85 g of cyclohexane were charged, and then, a mixed gas of TFE/ethylene (hereinafter referred to as "E")/perfluorocyclobutane (molar ratio=78.9/16.6/4.5) was injected up to 1.2 MPaG. Here, "G" represents a gauge pressure.

Then, 8.0 g of di-n-propyl peroxydicarbonate was charged to initiate polymerization. The pressure drops along with the progress of the polymerization, and therefore, the mixed gas of TFE/E/perfluorocyclobutane (molar ratio=52.8/42.7/4.5) was additionally injected to continue the polymerization while maintaining the polymerization pressure at 1.2 MPaG, and, during the polymerization, 1.15 g of PTHP and 0.13 g of C6-DV were charged dividedly in 9 times by a micropump, whereby the polymerization was carried out for 11 hours in total. After completion of the polymerization, the content was recovered and washed with water to obtain 137 g of a powdery fluorinated copolymer.

The obtained fluorinated copolymer had a melting point of 159° C., a Q value of 30 mm³/sec., a copolymer composition of TFE units/E units/HFP units/PTHP units/C6-DV units=46.0/36.0/17.5/0.5/0.03 (molar ratio), a MIT flex number of 8,000 times, and a content of carbonyl groups being 370 groups.

Example 2

153 g of a powdery fluorinated copolymer was obtained by repeating the same operations as in Example 1 except that the amounts of the perfluorocyclobutane and HFP initially charged, were changed to 600 g and 600 g, respectively, the charged amount of cyclohexane was changed to 1.6 g, the amount of di-n-propyl peroxydicarbonate was changed to 10.0 g, and the polymerization was conducted for 8 hours in total.

The obtained fluorinated copolymer had a melting point of 188° C., a Q value of 2 mm³/sec., a copolymer composition of TFE units/E units/HFP units/PTHP units/C6-DV units=48.8/37.8/13.0/0.4/0.03 (molar ratio), a MIT flex number of 9,000 times, and a content of carbonyl groups being 157 groups.

Comparative Example 1

150 g of a powdery fluorinated copolymer was obtained by repeating the same operations as in Example 2 except that the amount of C6-DV initially charged, was changed to 0.756 g, and the addition amount of C6-DV during the polymerization was changed to 0.91 g.

The obtained fluorinated copolymer had a Q value of 0 mm³/sec. and had no melt flowability. The fluorinated copolymer had a melting point of 187° C., a copolymer composition of TFE units/E units/HFP units/PTHP units/C6-DV units=48.8/37.2/13.3/0.4/0.20 (molar ratio), a MIT flex number of 400 times, and a content of carbonyl groups being 150 groups.

Comparative Example 2

140 g of a powdery fluorinated copolymer was obtained by repeating the same operations as in Example 2 except that the amount of C6-DV initially charged, was changed to 0.036 g, and the addition amount of C6-DV during the polymerization was changed to 0.04 g.

The obtained fluorinated copolymer had a melting point of 190° C., a Q value of 4 mm³/sec., a copolymer composition of TFE units/E units/HFP units/PTHP units/C6-DV units=48.8/37.4/13.3/0.4/0.01 (molar ratio), a MIT flex number of 15,000 times, and a content of carbonyl groups being 157 groups.

Comparative Example 3

136 g of a powdery fluorinated copolymer was obtained by repeating the same operations as in Example 1 except that the amount of C6-DV initially charged was changed to 0.036 g, the amounts of perfluorocyclobutane and HFP were changed to 700 g and 500 g, respectively, the charged amount of cyclohexane was changed to 1.5 g, the amount of C6-DV added during the polymerization was 0.04 g, and the polymerization was conducted for 5 hours in total.

The obtained fluorinated copolymer had a melting point of 209° C., a Q value of 1 mm³/sec., a copolymer composition of TFE units/E units/HFP units/PTHP units/C6-DV units=49.8/40.4/9.4/0.4/0.01 (molar ratio), a MIT flex number of 19,900 times, and a content of carbonyl groups being 120 groups.

Example 3

A polymerization tank having an internal volume of 1.3 liters and equipped with a stirrer, was deaerated, and 566 g of 1-hydrotridecafluorohexane, 243 g of 1,3-dichloro-1,1,2,2,3-pentafluoropropane (AK225cb, manufactured by Asahi Glass Company Limited, hereinafter referred to as "AK225cb"), 1.56 g of (perfluorobutyl)ethylene (hereinafter referred to as "PFBE") represented by $CH_2=CH(CF_2)_4F$ and 0.14 g of C6-DV were charged, then 371 g of HFP, 104 g of TFE and 3.4 g of E were injected, and the inside of the polymerization tank was heated to 66° C. As a polymerization initiator, 6.7 mL of a 5 mass % 1-hydrotridecafluorohexane solution of tert-butyl peroxypivalate was charged to initiate polymerization. In order to maintain the pressure to be constant during the polymerization, a monomer mixed gas with a composition of TFE/E=54/46 (molar ratio) was continuously charged, and, relative to the monomer mixed gas of TFE/E, 0.03 mol % of C6-DV, 0.5 mol % of PFBE and 0.1 mol % of an AK225cb solution of IAH (itaconic anhydride) were continuously charged. After 3.6 hours from the initiation of polymerization, at the time when 70 g of the monomer mixed gas had been charged, the internal temperature of the polymerization tank was lowered and at the same time, the inside was purged to normal pressure. The obtained slurry-form fluorinated copolymer was suction-filtered through a glass filter, and the fluorinated copolymer was dried at 120° C. for 15 hours to obtain 78 g of a fluorinated copolymer.

The obtained fluorinated copolymer had a melting point of 175° C., a Q value of 15 $mm^3$/sec., a copolymer composition of TFE units/E units/HFP units/PFBE units/IAH units/C6-DV units=47.0/43.6/8.9/0.5/0.1/0.03 (molar ratio), a MIT flex number of 4,500 times and a content of carbonyl groups being 1,030 groups.

Example 4

79 g of a fluorinated copolymer was obtained in the same manner as in Example 3 except that the amount of C6-DV charged was 0.23 g, and during the polymerization, relative to the monomer mixed gas of TFE/E, 0.05 mol % of C6-DV and 1.0 mol % of an AK225cb solution of IAH were continuously charged.

The obtained fluorinated copolymer had a melting point of 172° C., a Q value of 5 $mm^3$/sec., a copolymer composition of TFE units/E units/HFP units/PFBE units/IAH units/C6-DV units=47.0/43.6/8.9/0.5/1.0/0.05 (molar ratio), a MIT flex number of 2,200 times, and a content of carbonyl groups being 10,000 groups.

Example 5

74 g of a fluorinated copolymer was obtained in the same manner as in Example 3 except that the amount of C6-DV charged, was 0.32 g, and during the polymerization, relative to the monomer mixed gas of TFE/E, 0.07 mol % of C6-DV and 3.0 mol % of an AK225cb solution of IAH were continuously charged.

The obtained fluorinated copolymer had a melting point of 169° C., a Q value of 5 $mm^3$/sec., a copolymer composition of TFE units/E units/HFP units/PFBE units/IAH units/C6-DV units=47.0/43.6/8.9/0.5/3.0/0.07 (molar ratio), a MIT flex number of 1,800 times, and a content of carbonyl groups being 30,000 groups.

Comparative Example 4

75 g of a fluorinated copolymer was obtained in the same manner as in Example 3 except that the amount of C6-DV charged, was 0.95 g, and during the polymerization, relative to the monomer mixed gas of TFE/E, 0.20 mol % of C6-DV and 1.0 mol % of an AK225cb solution of IAH were continuously charged.

The fluorinated copolymer had a melting point of 170° C., a Q value of 0 $mm^3$/sec., a copolymer composition of TFE units/E units/HFP units/PFBE units/IAH units/C6-DV units=47.0/43.6/8.9/3.0/0.5/0.20 (molar ratio), a MIT flex number of 300 times, and a content of carbonyl groups being 5,000 groups.

Comparative Example 5

78 g of a fluorinated copolymer was obtained in the same manner as in Example 3 except that the amount of C6-DV charged, was 0.05 g, and during the polymerization, relative to the monomer mixed gas of TFE/E, 0.01 mol % of C6-DV and 0.01 mol % of an AK225cb solution of IAH were continuously charged.

The obtained fluorinated copolymer had a melting point of 175° C., a Q value of 25 $mm^3$/sec., a copolymer composition of TFE units/E units/HFP units/PFBE units/IAH units/C6-DV units=47.0/43.6/8.9/1.0/0.01/0.01 (molar ratio), a MIT flex number of 10,000, and a content of carbonyl groups being 100 groups.

With respect to the fluorinated copolymers obtained in Examples 1 to 5 and Comparative Examples 1 to 5, the results of measurements of the melting point, the Q value, the content of carbonyl groups (the number of carbonyl groups per $1\times10^6$ carbon atoms as the number of carbon atoms in the molecular chain composed of repeating content), X/W, the uniformity of strand diameter, the adhesive strength, and the MIT flex number, are shown in Table 1.

The load W, and the maximum value, minimum value and average value (i.e. melt tension X) of the withdrawal strength, obtained at the time of the evaluation of X/W, are also shown in Table 1.

TABLE 1

| | Melting point [° C.] | Q value [$mm^3$/sec] | Content of carbonyl groups [number] | Load W [N] | Withdrawal strength Minimum [mN] | Withdrawal strength Maximum [mN] | Average (melt tension X) [mN] | X/W [N/N] = [-] | Uniformity of strand diameter | Adhesive strength N/cm | MIT flex number [Times] |
|---|---|---|---|---|---|---|---|---|---|---|---|
| Ex. 1 | 159 | 30 | 370 | 230 | 24 | 32 | 28 | $1.2 \times 10^{-4}$ | ○ | 0.6 | 8000 |
| Ex. 2 | 188 | 2 | 157 | 344 | 33 | 37 | 35 | $1.0 \times 10^{-4}$ | ○ | 0.45 | 9000 |

TABLE 1-continued

|  | Melting point [°C.] | Q value [mm³/sec] | Content of carbonyl groups [number] | Load W [N] | Withdrawal strength | | | X/W [N/N] = [–] | Uniformity of strand diameter | Adhesive strength N/cm | MIT flex number [Times] |
|---|---|---|---|---|---|---|---|---|---|---|---|
|  |  |  |  |  | Minimum [mN] | Maximum [mN] | Average (melt tension X) [mN] |  |  |  |  |
| Comp. Ex. 1 | 187 | No flow | 150 | — | — | — | — | Not measurable | x | 0.33 | 400 |
| Comp. Ex. 2 | 190 | 4 | 157 | 301 | 7 | 11 | 9 | 3.1× 10⁻⁵ | x | 0.4 | 15000 |
| Comp. Ex. 3 | 209 | 1 | 120 | 337 | 12 | 16 | 14 | 4.1 × 10⁻⁵ | x | 0.03 | 19900 |
| Ex. 3 | 175 | 15 | 1030 | 279 | 21 | 25 | 23 | 8.3 × 10⁻⁵ | ○ | 2.1 | 4500 |
| Ex. 4 | 172 | 5 | 10000 | 313 | 34 | 36 | 35 | 1.1 × 10⁻⁴ | ○ | 14.1 | 2200 |
| Ex. 5 | 169 | 5 | 30000 | 322 | 42 | 48 | 46 | 1.4 × 10⁻⁴ | ○ | 15.3 | 1800 |
| Comp. Ex. 4 | 170 | No flow | 5000 | — | — | — | — | Not measurable | x | 13.9 | 300 |
| Comp. Ex. 5 | 175 | 25 | 100 | 268 | 6 | 9 | 8 | 3.1 × 10⁻⁵ | x | 0.03 | 10000 |

As shown in the above results, the fluorinated copolymers in Examples 1 to 5 had high uniformity of strand diameter and were excellent in elongation deformability. Further, their adhesive strength was large, and they were excellent in adhesion. Furthermore, their Q value was at least 2 mm³/sec., and they had melt-moldability. Further, they maintain a MIT flex number of at least 1,000 times, and their mechanical properties were also good.

Whereas, the fluorinated copolymers in Comparative Examples 1 to 5 had low uniformity of strand diameter, and they were inferior in elongation deformability. Further, the fluorinated copolymers in Comparative Examples 1 to 3 and 5, were inferior also in adhesion as compared to Examples 1 to 5. The fluorinated copolymers in Comparative Examples 1 and 4 did not have melt-moldability, and their mechanical properties were also poor.

This application is a continuation of PCT Application No. PCT/JP2015/068400, filed on Jun. 25, 2015, which is based upon and claims the benefit of priority from Japanese Patent Application No. 2014-132109 filed on Jun. 27, 2014. The contents of those applications are incorporated herein by reference in their entireties.

What is claimed is:

1. A fluorinated copolymer comprising units derived from:
monomer (a): tetrafluoroethylene;
monomer (b): ethylene;
monomer (c): a monomer having two or more polymerizable carbon-carbon double bonds; and
monomer (d): a monomer having a carbonyl group and one polymerizable carbon-carbon double bond,
wherein:
the fluorinated copolymer has carbonyl groups derived from monomer (d),
the fluorinated copolymer has a melting point of 120 to 230° C.,
a ratio (X/W) of a melt tension X (N) to a load W (N) at the time of measuring the melt tension X, is from $0.5 \times 10^{-4}$ to $2.0 \times 10^{-4}$,
a molar ratio of the units derived from the monomer (a) to the units derived from the monomer (b) is in a range from 30/70 to 70/30, and
a total content of the units derived from the monomer (a) and the units derived from the monomer (b) is from 80 to 99.995 mol % based on a total of all units.

2. The fluorinated copolymer according to claim 1, wherein a volume flow rate is from 0.5 to 100 mm³/sec, wherein the volume flow rate is an extrusion rate (mm³/sec) at the time of extruding the fluorinated copolymer from an orifice having a diameter of 2.1 mm and a length of 8 mm under a pressure of 68.7N/cm² at a temperature of the melting point+50° C.

3. The fluorinated copolymer according to claim 1, wherein the monomer (d) is an acid anhydride of an unsaturated dicarboxylic acid.

4. The fluorinated copolymer according to claim 1, wherein a content of carbonyl groups is from $1.5 \times 10^2$ to $1 \times 10^5$, wherein the content of carbonyl groups is the number of carbonyl groups relative to $1 \times 10^6$ carbon atoms in the molecular chain composed of repeating units in the fluorinated copolymer, as determined by an IR absorption spectrum analysis using a Fourier transform infrared spectrometer.

5. The fluorinated copolymer according to claim 1, wherein a content of the units derived from the monomer (c) is from 0.02 to 0.15 mol % based on the total of all units.

6. The fluorinated copolymer according to claim 1, wherein the monomer (c) is represented by formula (c1):

$$Y^1—R^f—Z^1 \tag{c1}$$

wherein $R^f$ is a fluoroalkylene group, and $Y^1$ and $Z^1$ are each independently a vinyl group, a trifluorovinyl group or a trifluorovinyloxy group.

7. The fluorinated copolymer according to claim 6, wherein $R^f$ is a perfluoroalkylene group having 2 to 8 carbon atoms.

8. The fluorinated copolymer according to claim 6, wherein the monomer (c) is a compound represented by $CH_2=CH—(CF_2)_{n2}—CH=CH_2$, wherein n2 is 4 or 6.

9. The fluorinated copolymer according to claim 1, further comprising units derived from monomer (e): hexafluoropropylene.

10. The fluorinated copolymer according to claim 9, wherein a content of the units derived from the monomer (e) is from 4 to 19 mol % based on the total of all units.

11. The fluorinated copolymer according to claim 1, further comprising units derived from a monomer (f1) represented by formula (f1):

$$CH_2=CX^2(CF_2)_{n3}Y^2 \tag{f1}$$

wherein $X^2$ and $Y^2$ are each a hydrogen atom or a fluorine atom, and n3 is an integer of from 2 to 10.

12. The fluorinated copolymer according to claim 11, wherein the monomer (f1) is a compound represented by $CH_2=CH(CF_2)_{n4}F$ or $CH_2=CF(CF_2)_{n4}H$, wherein n4 is an integer of from 2 to 6.

13. The fluorinated copolymer according to claim 11, wherein a content of the units derived from the monomer (f1) is from 0.1 to 15 mol % based on the total of all units.

14. The fluorinated copolymer according to claim 1, wherein a content of carbonyl groups is from $4.5\times10^2$ to $3\times10^4$, wherein the content of carbonyl groups is the number of carbonyl groups relative to $1\times10^6$ carbon atoms in the molecular chain composed of repeating units in the fluorinated copolymer, as determined by an IR absorption spectrum analysis using a Fourier transform infrared spectrometer.

15. A fluorinated copolymer comprising units derived from:
monomer (a): tetrafluoroethylene;
monomer (b): ethylene; and
monomer (c): a monomer having two or more polymerizable carbon-carbon double bonds,
wherein:
the fluorinated copolymer has carbonyl groups derived from a radical polymerization initiator having a carbonyl group or a chain transfer agent having a carbonyl group,
the fluorinated copolymer has a melting point of 120 to 230° C.,
a ratio (X/W) of a melt tension X (N) to a load W (N) at the time of measuring the melt tension X, is from $0.5\times10^{-4}$ to $2.0\times10^{-4}$,
a molar ratio of the units derived from the monomer (a) to the units derived from the monomer (b) is in a range from 30/70 to 70/30, and
a total content of the units derived from the monomer (a) and the units derived from the monomer (b) is from 80 to 99.995 mol % based on a total of all units.

* * * * *